US012079509B2

(12) United States Patent
Confalonieri et al.

(10) Patent No.: US 12,079,509 B2
(45) Date of Patent: Sep. 3, 2024

(54) CONTROLLERS AND METHODS FOR ACCESSING MEMORY DEVICES VIA MULTIPLE MODES

(71) Applicant: Micron Technology, Inc., Boise, ID (US)

(72) Inventors: Emanuele Confalonieri, Segrate (IT); Daniele Balluchi, Cernusco Sul Naviglio (IT); Paolo Amato, Treviglio (IT); Danilo Caraccio, Milan (IT); Marco Sforzin, Cernusco Sul Naviglio (IT)

(73) Assignee: Micron Technology, Inc., Boise, ID (US)

( * ) Notice: Subject to any disclaimer, the term of this patent is extended or adjusted under 35 U.S.C. 154(b) by 119 days.

(21) Appl. No.: 17/868,286

(22) Filed: Jul. 19, 2022

(65) Prior Publication Data

US 2024/0028249 A1 Jan. 25, 2024

(51) Int. Cl.

| | |
|---|---|
| ***G06F 3/06*** | (2006.01) |
| ***G06F 3/00*** | (2006.01) |
| ***G06F 11/00*** | (2006.01) |
| ***G06F 11/10*** | (2006.01) |

(52) U.S. Cl.

CPC .......... *G06F 3/0655* (2013.01); *G06F 3/0604* (2013.01); *G06F 3/0679* (2013.01); *G06F 11/1048* (2013.01)

(58) Field of Classification Search

CPC .... G06F 3/0655; G06F 3/0604; G06F 3/0679; G06F 11/1048

See application file for complete search history.

(56) References Cited

U.S. PATENT DOCUMENTS

| | | | | |
|---|---|---|---|---|
| 6,370,668 | B1 * | 4/2002 | Garrett, Jr. | G06F 11/1044 714/763 |
| 6,567,950 | B1 * | 5/2003 | Bertin | G11C 29/838 714/767 |
| 6,691,276 | B2 * | 2/2004 | Holman | G06F 11/1028 714/767 |
| 9,891,864 | B2 * | 2/2018 | Pax | G06F 3/0619 |
| 10,606,692 | B2 * | 3/2020 | Coteus | G06F 11/1064 |
| 11,463,110 | B2 * | 10/2022 | Kim | G06F 11/1048 |

OTHER PUBLICATIONS

U.S. Appl. No. 17/158,874, entitled, "Memory Device Protection," filed Jan. 26, 2021, 45 pages.

* cited by examiner

*Primary Examiner* — Justin R Knapp

(74) *Attorney, Agent, or Firm* — Brooks, Cameron & Huebsch, PLLC

(57) ABSTRACT

A memory controller can include media controllers respectively coupled to memory devices. A first set of media controllers can be enabled during a first operating mode of the memory controller and a second set of media controller can be enabled during a second operating mode of the memory controller, during which some features, such as low-power features, can be disabled. Data accessed by each media controller of the first set can be aligned prior to being further transmitted to other circuitries of the memory controller that are dedicated, for example, for the low-power features.

26 Claims, 6 Drawing Sheets

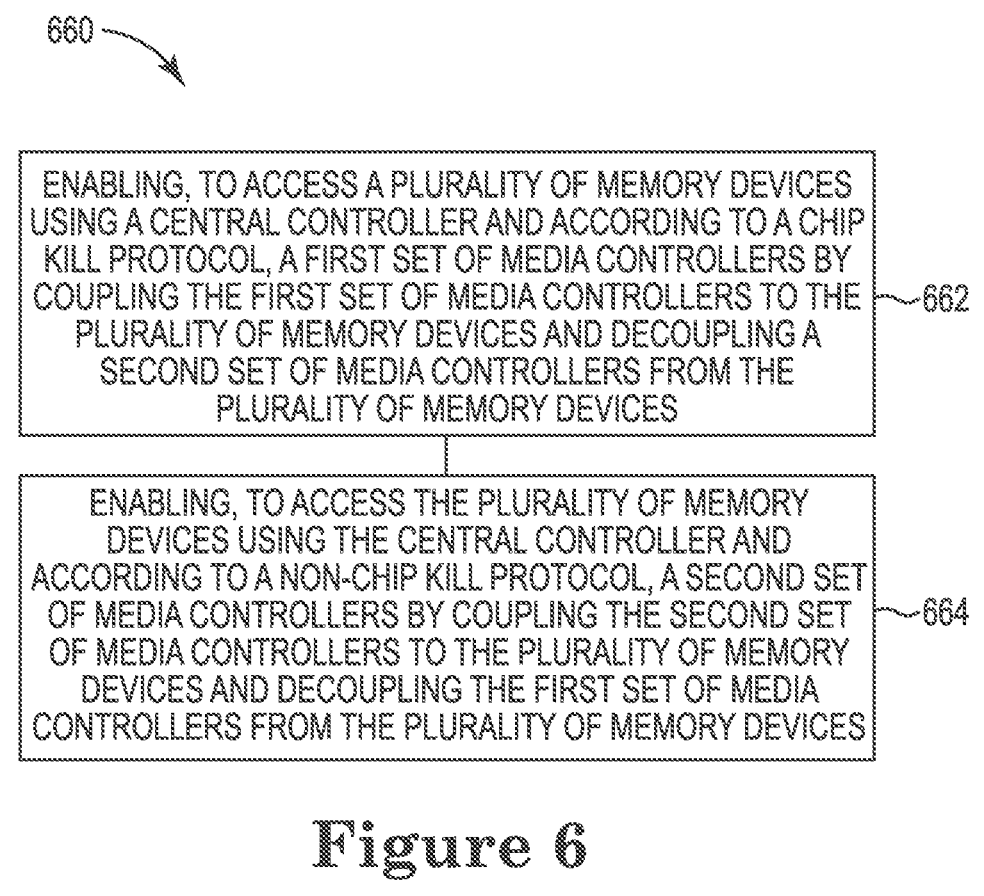

660

ENABLING, TO ACCESS A PLURALITY OF MEMORY DEVICES USING A CENTRAL CONTROLLER AND ACCORDING TO A CHIP KILL PROTOCOL, A FIRST SET OF MEDIA CONTROLLERS BY COUPLING THE FIRST SET OF MEDIA CONTROLLERS TO THE PLURALITY OF MEMORY DEVICES AND DECOUPLING A SECOND SET OF MEDIA CONTROLLERS FROM THE PLURALITY OF MEMORY DEVICES — 662

ENABLING, TO ACCESS THE PLURALITY OF MEMORY DEVICES USING THE CENTRAL CONTROLLER AND ACCORDING TO A NON-CHIP KILL PROTOCOL, A SECOND SET OF MEDIA CONTROLLERS BY COUPLING THE SECOND SET OF MEDIA CONTROLLERS TO THE PLURALITY OF MEMORY DEVICES AND DECOUPLING THE FIRST SET OF MEDIA CONTROLLERS FROM THE PLURALITY OF MEMORY DEVICES — 664

Figure 6

CONTROLLERS AND METHODS FOR ACCESSING MEMORY DEVICES VIA MULTIPLE MODES

TECHNICAL FIELD

The present disclosure relates generally to semiconductor memory and methods, and more particularly, to apparatuses, systems, and methods for accessing memory devices via multiple modes.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

BRIEF DESCRIPTION OF THE DRAWINGS

FIG. 6 is a flow diagram of a method for accessing memory devices in different operating modes in accordance with a number of embodiments of the present disclosure.

DETAILED DESCRIPTION

Figure 1:
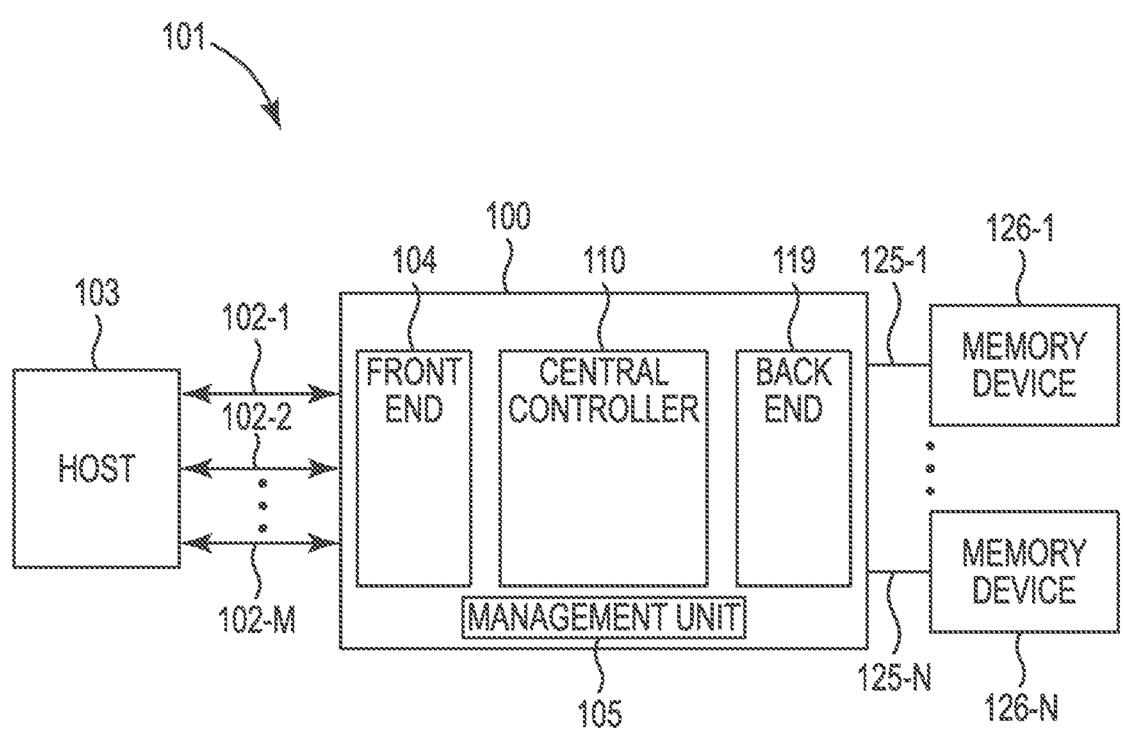
FIG. 1 is a functional block diagram of a computing system including a memory controller in accordance with a number of embodiments of the present disclosure.

Systems, apparatuses, and methods related to accessing memory devices via multiple modes are described. In some circumstances, subsets of data that are distributed over multiple memory devices often need to be processed together at various circuitries/components (e.g., the circuitry dedicated for data protection schemes). When respective memory devices are accessed by separate media controllers, misaligned accesses to the memory devices and/or among the subsets of data can incur. This can often lead to a greater risk such as a refresh to restart a read of the subsets of data, which can substantially increase latencies associated with processing the subsets of data.

Various embodiments described herein are directed to providing a controller (e.g., a memory controller) comprising sets of media controllers that are configured to access memory devices in according to different operating modes. For example, each media controller of a first set can be configured to manage/access multiple memory devices for subsets of data that need to be processed together for various purposes, such as for data protection schemes. The data protection schemes can be provided by a "chip kill", in which the memory system can recover data even if a constituent chip, such as a memory device, is damaged or otherwise unavailable; thereby, avoiding a situation in which one of the chips becomes a single point of failure (SPOF) of the memory system.

The accessed subsets can be aligned at the respective media controller of the first set prior to being transmitted to the other circuitries, for example, that are dedicated for the data protection schemes. A second set of media controllers can be activated in lieu of the first set to access data stored in the memory devices without aligning those at the respective controller of the second set in the event that the data alignment is not needed because the data protection scheme is deactivated. The embodiments of the present disclosure can dynamically enable/disable those sets of controllers to switch among the manners, in which the memory devices are accessed.

In some embodiments, the memory system can be a compute express link (CXL) compliant memory system. The host interface can be managed with CXL protocols and be coupled to the host via an interface configured for a peripheral component interconnect express (PCIe) protocol. CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost. CXL is designed to be an industry open standard interface for high-speed communications, as accelerators are increasingly used to complement CPUs in support of emerging applications such as artificial intelligence and machine learning. CXL technology is built on the PCIe infrastructure, leveraging PCIe physical and electrical interfaces to provide advanced protocol in areas such as input/output (I/O) protocol, memory protocol (e.g., initially allowing a host to share memory with an accelerator), and coherency interface.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. It is to be understood that data can be transmitted (alternatively, "provided"), received, or exchanged by electronic signals (e.g., current, voltage, etc.) and that the phrase "signal indicative of [data]" represents the data itself being transmitted, received, or exchanged in a physical medium.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. Analogous elements within a Figure may be referenced with a hyphen and extra numeral or letter. See, for example, elements 126-1, 126-2, 126-M in FIG. 1. Such analogous elements may be generally referenced without the hyphen and extra numeral or letter. For example, elements 126-1, 126-2, 126-M may be collectively referenced as 126. As used herein, the designators "M", "N", "Q", "P", "S" and "L", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a functional block diagram of a computing system 101 including a memory controller 100 in accordance with a number of embodiments of the present disclosure. The memory controller 100 can include a front end portion 104, a central controller portion 110 (e.g., alternatively referred to as "central controller), and a back end portion 119. The computing system 101 can include a host 103 and memory devices 126-1, . . . , 126-N coupled to the memory controller 100. In some embodiments, the memory controller 100 can serve as a system controller of a memory system.

The front end portion 104 includes an interface and interface management circuitry to couple the memory controller 100 to the host 103 through input/output (I/O) lanes 102-1, 102-2, . . . , 102-M and circuitry to manage the I/O lanes 102. There can be any quantity of I/O lanes 102, such as eight, sixteen, or another quantity of I/O lanes 102. In some embodiments, the I/O lanes 102 can be configured as a single port. In at least one embodiment, the interface between the memory controller 100 and the host 103 can be a PCIe physical and electrical interface operated according to a CXL protocol.

The central controller portion 110 can include and/or be referred to as data management circuitry. The central controller portion 110 can control, in response to receiving a request from the host 103, performance of a memory operation. Examples of the memory operation include a read operation to read data from a memory device 122 or a write operation to write data to a memory device 122.

The central controller portion 110 can generate error detection information and/or error correction information based on data received from the host 103. The central controller portion 110 can perform error detection operations and/or error correction operations on data received from the host 103 or from the memory devices 122.

The back end portion 119 can include media controllers and a physical (PHY) layer that couples the memory controller 100 to the memory devices 126. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium. The physical data transmission medium can include channels 125-1, . . . , 125-N. In some embodiments, the channels 125 can include a sixteen-pin data bus and a two pin data mask inversion (DMI) bus, among other possible buses. The back end portion 119 can exchange (e.g., transmit or receive) data with the memory devices 126 via the data pins and exchange error detection information and/or error correction information with the memory devices 126 via the DMI pins. The error detection information and/or error correction information can be exchanged contemporaneously with the exchange of data.

An example of the memory devices 126 is dynamic random access memory (DRAM) operated according to a protocol such as low-power double data rate (LPDDRx), which may be referred to herein as LPDDRx DRAM devices, LPDDRx memory, etc. The "x" in LPDDRx refers to any of a number of generations of the protocol (e.g., LPDDR5). In at least one embodiment, at least one of the memory devices 126-1 is operated as an LPDDRx DRAM device with low-power features enabled and at least one of the memory devices 126-N is operated an LPDDRx DRAM device with at least one low-power feature disabled. In some embodiments, although the memory devices 126 are LPDDRx memory devices, the memory devices 126 do not include circuitry configured to provide low-power functionality for the memory devices 126 such as a dynamic voltage frequency scaling core (DVFSC), a sub-threshold current reduce circuit (SCRC), or other low-power functionality providing circuitry. Providing the LPDDRx memory devices 126 without such circuitry can advantageously reduce the cost, size, and/or complexity of the LPDDRx memory devices 126. By way of example, an LPDDRx memory device 126 with reduced low-power functionality providing circuitry can be used for applications other than mobile applications (e.g., if the memory is not intended to be used in a mobile application, some or all low-power functionality may be sacrificed for a reduction in the cost of producing the memory).

Figure 2:
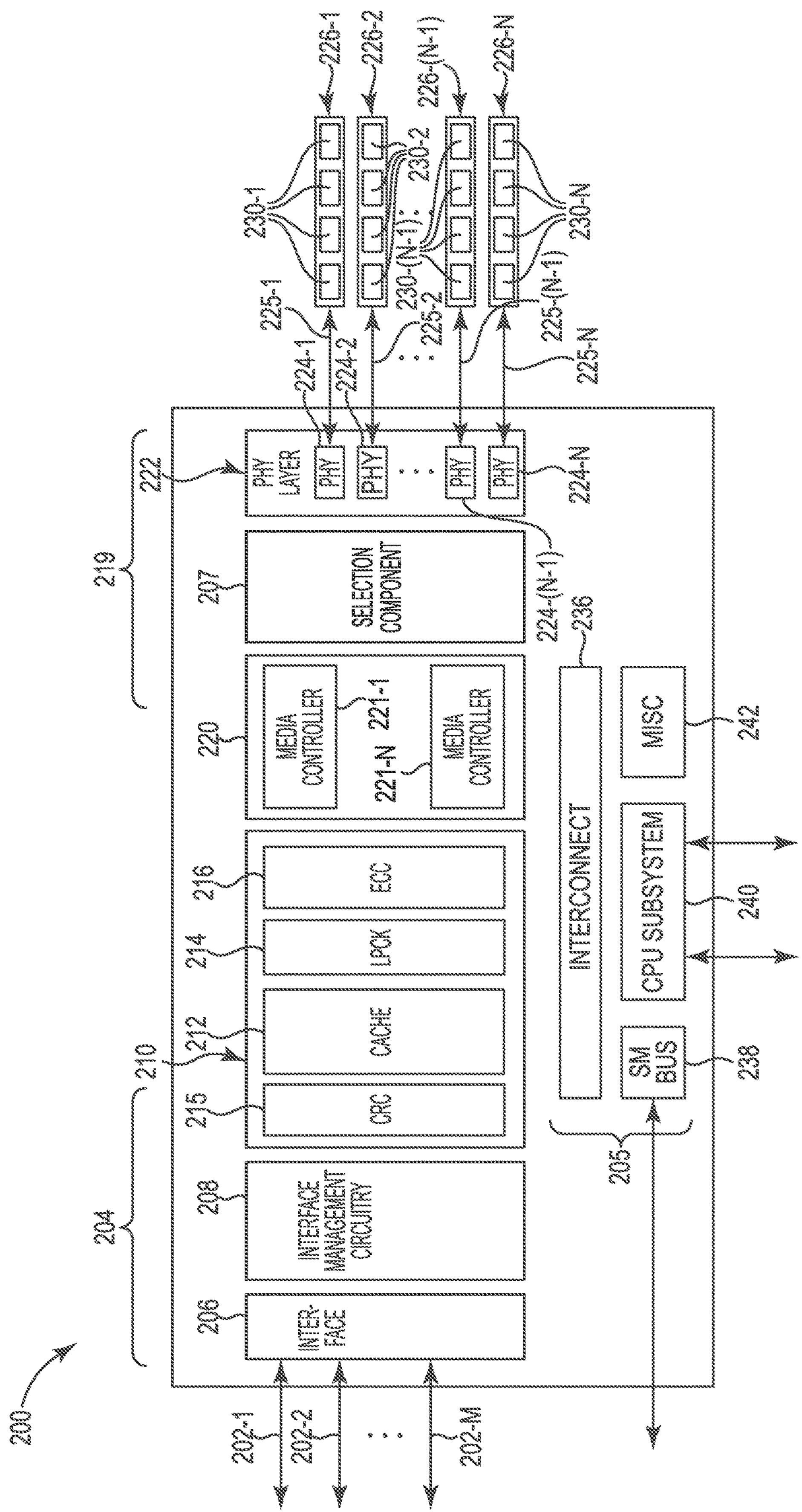
FIG. 2 is a functional block diagram of a memory controller in accordance with a number of embodiments of the present disclosure.
Figure 3:
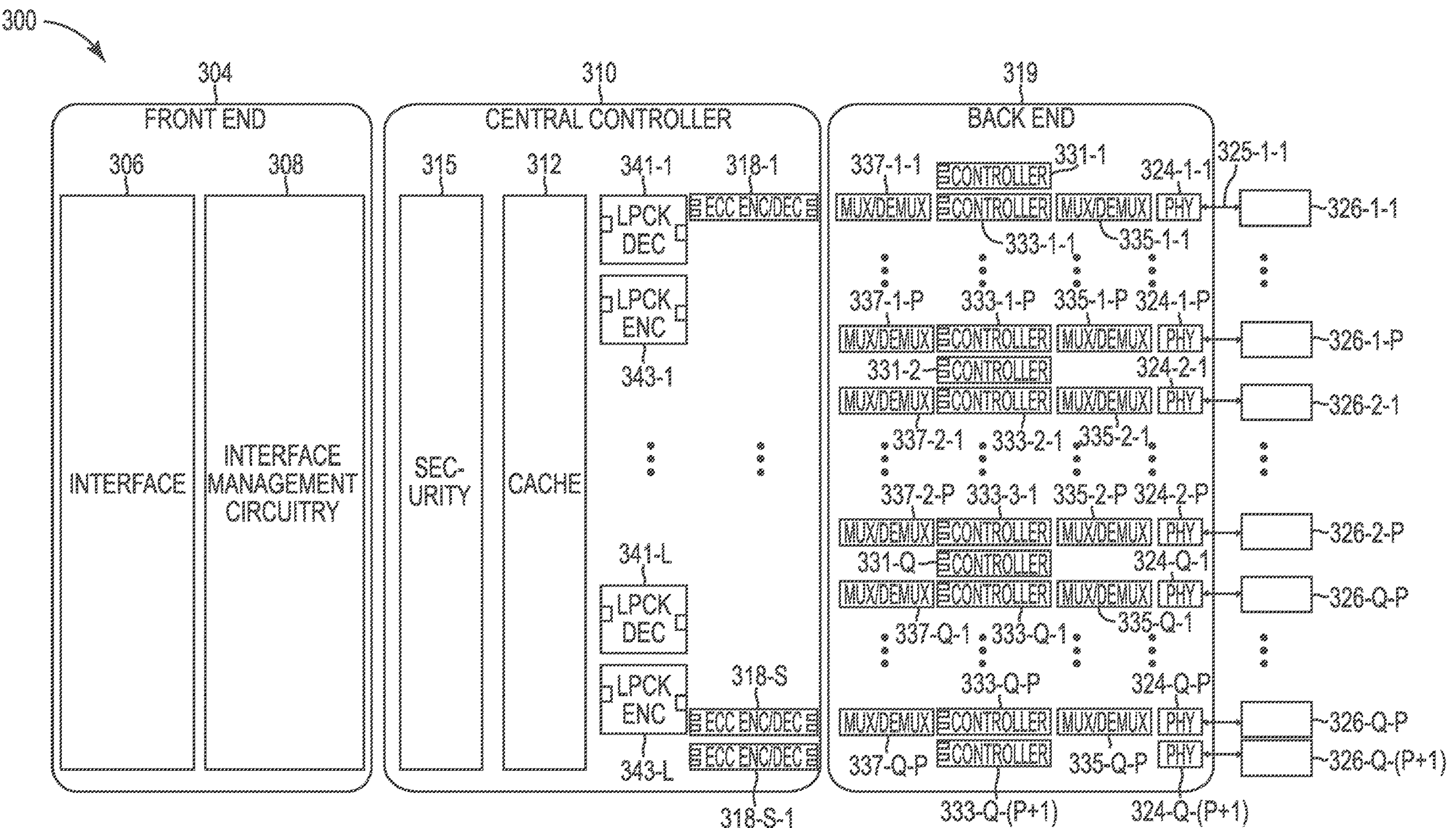
FIG. 3 is a functional block diagram of a portion of a memory controller in accordance with a number of embodiments of the present disclosure.

The back end portion 119 can include switch circuitry (e.g., switch circuitry 207 illustrated in FIG. 2) that can include one or more switches, such as sets of multiplexers/demultiplexers (e.g., multiplexers/demultiplexers 335 and 337 illustrated in FIG. 3). The central controller portion 110 can control the switch circuitry to selectively allow (e.g., enable) a portion of the media controllers of the back end portion 119 to access the memory devices 126 via the channels 125, while preventing (e.g., disabling) another portion of the media controllers from accessing the memory devices 126. Sets of media controllers can be configured for different operating modes. Therefore, by selectively allowing different portions of the media controllers to access the memory devices 126, the memory controller 100 can be operated according to different operating modes (e.g., configuration).

In one operating mode, the memory devices 126 can be accessed in a manner that allows performance of a chip kill operation on data accessed from the memory devices 126. In a different operating mode, the memory devices 126 can be accessed in a manner that does not necessarily provide a chip kill capability. The chip kill provided here can protects memory systems (e.g., the memory system 101 shown in FIG. 1) from any single memory device 126 (chip) failure as well as multi-bit error from any portion of a single memory chip.

In some embodiments, the memory controller 100 can include a management unit 105 to initialize, configure, and/or monitor characteristics of the memory controller 100. The management unit 105 can include an I/O bus to manage out-of-band data and/or commands, a management unit controller to execute instructions associated with initializing, configuring, and/or monitoring the characteristics of the memory controller, and a management unit memory to store data associated with initializing, configuring, and/or monitoring the characteristics of the memory controller 100. As used herein, the term "out-of-band" generally refers to a transmission medium that is different from a primary transmission medium of a network. For example, out-of-band data and/or commands can be data and/or commands transferred to a network using a different transmission medium than the transmission medium used to transfer data within the network.

FIG. 2 is a functional block diagram of a memory controller 200 in accordance with a number of embodiments of the present disclosure. As shown in FIG. 2, a front end portion 204 can include an interface 206, which includes multiple I/O lanes 202-1, 202-2, . . . , 202-M, as well as interface management circuitry 208 to manage the interface 206. An example of the interface 206 is a peripheral component interconnect express (PCIe) 5.0 interface. In some embodiments, the memory controller 200 can receive access requests involving at least one of the cache memory 212 and the memory devices 226-1, 226-2, . . . , 226-(N−1), 226-N via the interface 206 according to a CXL protocol. The interface 206 can receive data from a host (e.g., the host 103 shown in FIG. 1) through the of I/O lanes 202. The interface management circuitry 208 may use CXL protocols to manage the interface 206 and may be referred to as CXL interface management circuitry 208. The CXL interface management circuitry 208 can be coupled to a host via the PCIe interface 206.

A central controller portion 210 (e.g., alternatively referred to as "central controller) can be coupled to the interface management circuitry 208. The central controller portion 210 can be configured to cause performance of a memory operation.

The central controller portion 210 can include a security component 215 to encrypt data before the data is stored in the memory device 226, and/or a cache memory 212. Examples of the security component can include, but are not limited to, software and circuitry configured to implement data encryption, data hashing, data masking, and data tokenization. In some embodiments, the data can be encrypted using an Advanced Encryption Standard (AES) encryption before the data is stored in the cache memory 212.

The cache memory 212 can be configured to store data, error detection information, error correction information, and/or metadata associated with performance of the memory operation. An example of the cache memory 212 is a thirty two (32) way set-associative cache memory including multiple cache lines. The cache line size can be equal to or greater than the memory controller 200 access granularity (e.g., 64 bytes for a CXL protocol). For example, each cache line can include 256 bytes of data. In another example, each cache line can include 512 bytes of data. Read and write requests of CXL memory systems can be 64 bytes in size. Therefore, data entries in the cache memory 212 can have 64 bytes of data. Each cache line can comprise 256 bytes. Therefore, multiple 64-byte requests can be stored in each cache line. In response to a request from the host, the memory controller 200 can write 256 bytes of data to a memory device 226. In some embodiments, the 256 bytes of data can be written in 64-byte chunks. Use of the cache memory 212 to store data associated with a read operation or a write operation can increase a speed and/or efficiency of accessing the data because the cache memory 212 can prefetch the data and store the data in multiple 64-byte blocks in the case of a cache miss. Instead of searching a separate memory device in the event of a cache miss, the data can be read from the cache memory 212. Less time and energy may be used accessing the prefetched data than would be used if the memory system has to search for the data before accessing the data.

The central controller portion 210 can include an error correction code (ECC) circuitry 216 that can generate error correction information and/or error detection information based on data received from a host (e.g., the host 103 illustrated in FIG. 1). In some embodiments, the generated error correction information and the error detection information can be stored in various locations of the memory devices 226. The ECC circuitry 216 can further perform an error correction operation and/or error detection operation using the error correction information and/or error detection information. The ECC circuitry 216 can be coupled to any of the cache memory 212, LPCK circuitry 214, or the security component 215.

An example of error correction information can be parity data to correct a quantity of bit errors on data and/or detect a quantity of bit errors. For example, an error correction information can be to correct a single bit error and detect two-bit errors on data. An example of error detection information can be cyclic redundancy check (CRC) data. An error detection operation using the CRC data may be referred to as algebraic error detection. The error detection operation can include the use of a check value resulting from an algebraic calculation using the data to be protected. The error detection operation can detect accidental changes to data by comparing a check value stored in association with the data to the check value calculated based on the data.

In some embodiments, the error correction information and the error detection information that were previously generated (at the central controller portion 210) based on data later stored in one memory device 226 can be stored in the same memory device 226. When the data is read from the memory device 226, the error correction information and/or the error detection information can be read as well such that one or more bit-errors in the data can be corrected and/or detected using the information.

The central controller portion 210 can include low-power chip kill (LPCK) circuitry 214 coupled between the cache memory 212 and the ECC circuitry 216. The LPCK circuitry 214 can be configured to generate error correction information (e.g., LPCK parity) on data received from the host and store the LPCK parity in various/dedicated locations of the memory devices 226. The data that share the same LPCK parity (e.g., used together to generate the LPCK parity) can be referred to as being striped together. The LPCK circuitry 214 can further perform chip kill operations on the data using the LPCK parity. The LPCK circuitry 214 can be used to provide increased reliability of the data and correct errors in the data.

An example chip kill implementation for a memory controller 200 including eleven channels 225 and a bus width of 176 bits coupled to eleven memory devices 226 can include writing data to eight of the eleven memory devices 226 and parity data to three of the eleven memory devices 226. Four codewords can be written, each composed of eleven four-bit symbols, with each symbol belonging to a different memory device 226. A first codeword can comprise the first four-bit symbol of each memory device 226, a second codeword can comprise the second four-bit symbol of each memory device 226, a third codeword can comprise the third four-bit symbol of each memory device 226, and a fourth codeword can comprise the fourth four-bit symbol of each memory device 226. A multibit symbol (e.g., four-bit symbol) can be a non-binary symbol. For example, non-binary symbol(s) having N bits can be one of $2^N$ elements of a finite Galois field.

The three parity symbols can allow the LPCK circuitry 214 to correct up to one symbol error in each codeword and to detect up to two symbol errors. If instead of adding three parity symbols, only two parity symbols are added, the LPCK circuitry 214 can correct up to one symbol error but only detect one symbol error. In some embodiments, the data symbols and the parity symbols can be written or read concurrently from the memory devices 226. If every bit symbol in a die fails, only the bit symbols from that memory device 226 in the codeword will fail. This allows memory contents to be reconstructed despite the complete failure of one memory device 226. LPCK is considered to be "on-the-fly correction" because the data is corrected without impacting performance by performing a repair operation.

The LPCK circuitry 214 can be selectively enabled/disabled (e.g., by the central controller portion 210) based on an operating mode the memory controller 200. For example, if the memory controller 200 is operated according to an LPCK mode, the central controller portion 210 can disable the LPCK circuitry 214. For example, if the memory controller 200 is operated according to a non-LPCK mode, the central controller portion 210 can enable the LPCK circuitry 214. Accordingly, when the memory controller 200 is operated according to a non-LPCK mode and when an LPCK mode is disabled, data accessed from the memory devices 226 can be provided to the front end portion 204 without the LPCK being performed on the data.

As shown in FIG. 2, the memory controller 200 can include a back end portion 219 including a media control circuitry 220 coupled to the data management circuitry 210. The media control circuitry 220 can include media controllers 221-1, 221-2. The back end portion 219 can include a physical (PHY) layer 222 having PHY memory interfaces 224-1, 224-2, . . . , 224-(N−1), 224-N. Each PHY memory interface 224 is configured to be coupled to a respective memory device 226.

The PHY layer 222 can be an LPDDRx memory interface. In some embodiments, each of the PHY memory interfaces 224 can include data and DMI pins. For example, each PHY memory interface 224 can include sixteen data pins and two DMI pins. The media control circuitry 220 can be configured to exchange data with a respective memory device 226 via the data pins. The media control circuitry 220 can be configured to exchange error correction information, error detection information, and or metadata via the DMI pins as opposed to exchanging such information via the data pins. The DMI pins can serve multiple functions, such as data mask, data bus inversion, and parity for read operations by setting a mode register. The DMI bus uses a bidirectional signal. In some instances, each transferred byte of data has a corresponding signal sent via the DMI pins for selection of the data. In at least one embodiment, the data can be exchanged contemporaneously with the error correction information and/or the error detection information. For example, 64 bytes of data can be exchanged (transmitted or received) via the data pins while 35 bits of error detection information (and metadata) and 21 bits of error correction information are exchanged via the DMI pins. Such embodiments reduce what would otherwise be overhead on the data input/output (e.g., also referred to in the art as a "DQ") bus for transferring error correction information, error detection information, and/or metadata.

The back end portion 219 can couple the PHY layer portion 222 to memory devices 226-1, 226-2, . . . , 226-(N−1), 226-N. The memory devices 226 each include at least one array of memory cells. In some embodiments, the memory devices 226 can be a group of memory dice with some of the memory dice coupled to the respective channel for transferring data stored in the memory device 226. For example, the memory device 226 can include four memory dice with two memory dice coupled to the respective channel 225 such that data stored in the memory dice of the memory device 226 can be transferred through those two memory dice.

In some embodiments, the memory devices 226 can be different types of memory. The media control circuitry 220 can be configured to control at least two different types of memory. For example, the memory devices 226-1, 226-2 can be LPDDRx memory operated according to a first protocol and the memory devices 226-(N−1), 226-N can be LPDDRx memory operated according to a second protocol different from the first protocol. In such an example, the first media controller 221-1 can be configured to control a first subset of the memory devices 226-1, 226-2 according to the first protocol and the second media controller 221-2 can be configured to control a second subset of the memory devices 226-(N−1), 226-N according to the second protocol. In a specific example, the memory devices 226-1, 226-2 may have on board error correction circuitry.

The back end portion 219 can include switch circuitry 207. The switch circuitry 207 can include a number of switches, such as a number of multiplexers and/or demultiplexers (e.g., multiplexers/demultiplexers 335 and 337 illustrated in FIG. 3) that can be coupled between media control circuitry 220 and the PHY layer 222 and/or between the ECC circuitry 216. In an example, the central controller portion 210 can control each set of multiplexer and demultiplexer of the switch circuitry 207 to couple a first set of media controllers 221 to the PHY memory interfaces 224 to operate according to a first operating mode (e.g., LPCK mode) and couple a second (e.g., different) set of media controllers 221 to the PHY memory interfaces 224 to operate the computing system 101 in a second operating mode (e.g., non-LPCK mode).

In an LPCK mode, each media controller 221 (that is configured to access the memory devices 226 under an LPCK mode) accesses data and parity symbols that are striped together (e.g., the symbols that are to be processed together for an LPCK) from multiple memory devices and align those symbols prior to transmitting (e.g., providing) those to the central controller portion 210 (e.g., to the ECC circuitry 216) together. Alternatively speaking, the media controller 221 waits until all of the data and parity symbols are received from the memory devices 226 prior to transmitting those to the central controller portion 210.

In a non-LPCK mode, each media controller 221 (that is configured to access the memory devices 226 according to a non-LPCK mode) accesses one or more memory devices and further transmit the accessed data to the central controller portion 210 (e.g., to the ECC circuitry 216) in an order in which they are received without having to wait for all of the data that are striped together and distributed across the multiple memory devices to be received.

The memory controller 200 can include a management unit 205 configured to initialize, configure, and/or monitor characteristics of the memory controller 200. In some embodiments, the management unit 205 includes a system management (SM) bus 238. The SM bus 238 can manage out-of-band data and/or commands. The SM bus 238 can be part of a serial presence detect. In some embodiments, the SM bus 238 can be a single-ended simple two-wire bus for the purpose of lightweight communication. The management unit 205 can include a CPU subsystem 240, which can function as a controller for the management unit to execute instructions associated with initializing, configuring, and/or monitoring the characteristics of the memory controller 200. The management unit 205 can include miscellaneous circuitry 242, such as local memory to store codes and/or data associated with managing and/or monitoring the characteristics of the memory controller 200. An endpoint of the management unit 205 can be exposed to the host system (e.g., the host 103 shown in FIG. 1) to manage data. In some embodiments, the characteristics monitored by the management unit 205 can include a voltage supplied to the memory controller 200 and/or a temperature measured by an external sensor. The management unit 205 can include an interconnect 236, such as an advanced high-performance bus (AHB) to couple different components of the management unit 205.

The management unit 205 can include circuitry to manage in-band data (e.g., data that is transferred through the main transmission medium within a network, such as a local area network (LAN)). In some embodiments, the CPU subsystem 240 can be a controller that meets the Joint Test Action Group (JTAG) standard and operate according to an Inter-Integrate Circuit ($I^2C$ or $I^3C$) protocol, and auxiliary I/O circuitry. JTAG generally refers to an industry standard for verifying designs and testing printed circuitry boards after manufacture. $I^2C$ generally refers to a serial protocol for a two-wire interface to connect low-speed devices like microcontrollers, I/O interfaces, and other similar peripherals in embedded systems. In some embodiments, the auxiliary I/O circuitry can couple the management unit 205 to the memory controller 200. Further, firmware for operating the management unit can be stored in the miscellaneous circuitry 242. In some embodiments, the miscellaneous circuitry 242 can be a flash memory such as flash NOR memory or other persistent flash memory device.

FIG. 3 is a functional block diagram of a portion of a memory controller 300 in accordance with a number of embodiments of the present disclosure. The memory controller 300 can include a front end portion 304, a central controller portion 310 (e.g., alternatively referred to as "central controller), and a back end portion 319. The front end portion 304 can include an interface 306, with multiple I/O lanes 302-1, 302-2, . . . , 302-M, as well as interface management circuitry 308 to manage the interface 306. The central controller portion 310 can include the security component 315, the cache memory 312, LPCK encoders 341-1, . . . , 341-L, and LPCK decoders 343-1, . . . , 343-L. The LPCK encoders 341 can be configured for LPCK encoding and the LPCK decoders 343 can be configured for LPCK decoding. LPCK encoding refers to encoding data by adding LPCK parity data (e.g., parity symbols) to the data. LPCK decoding refers to performing a chip kill operation on the data using the LPCK parity data.

The LPCK encoders 341 and decoders 343 can be part of the LPCK circuitry 214 illustrated in FIG. 2 and can be selectively enabled/disabled, for example, based on an operating mode the memory controller 300 operates according to. For example, the LPCK encoders 341 and decoders 343 can be disabled when the memory controller 300 operates according to a non-LPCK mode, while enabled when the memory controller 300 operates according to a LPCK mode. The central controller portion 310 can further include ECC encoders/decoders 318-1, . . . , 318-S, and 318-(S+1) that can be part of the ECC circuitry 216 illustrated in FIG. 2.

The back end portion 319 can include media control circuitry 320 and a PHY layer 322. The media control circuitry 320 can include media controllers 331-1, . . . , 331-3 and 333-1, . . . , 333-Q-(P+1) that are analogous to the media controllers 221. The PHY layer 322 can include PHY memory interfaces 324-1-1, . . . , 324-1-P, 324-2-1, . . . , 324-2-P, 324-Q-1, 324-Q-P, and 324-Q-(P+1) that are configured to be coupled to memory devices 326-1-1, . . . , 326-1-P, 326-2-1, . . . , 326-2-P, 326-Q-1, 326-Q-P, and 326-Q-(P+1), which may be referred to collectively as memory devices 326, via channels 325-1-1, . . . , 325-1-P, 325-2-1, . . . , 325-2-P, 325-Q-1, . . . , 325-Q-P, and 325-Q-(P+1), which may be referred to collectively as channels 325. Although one memory device 326 is shown per channel 325, each memory device 326 can comprise a plurality of memory dice per channel 325, for example.

The channels 325 can each be made up of a respective quantity of data lines (DQs), which may also be referred to as pins or pads. For example, each channel 325 can include 16 DQs. As an example, each memory device 326 can comprise two x8 memory dice (e.g., memory dice having 8 DQs), with each of the memory dice contributing 8 bits to fill a x16 channel 325.

The back end portion 319 can further include a number of switches. Each switch ("Mux/DeMux" shown in FIG. 3) illustrated in FIG. 3 can be a multiplexer or a demultiplexer, or both. In various embodiments, the switches can be coupled between the PHY memory interfaces 324 and the media controllers 331 and 333. The back end portion 319 can further include switches 337 coupled between the ECC encoder/decoder 318 and the media controllers 331 and 333. In some embodiments, the switch 335 and/or 337 can include a double data rate (DDR) physical interface (DFI) multiplexer or demultiplexer.

The media controllers 331 and 333 can be configured to access the memory devices 326 according to different protocols. For example, the media controllers 331 can be configured to access according to a protocol corresponding to an LPCK mode (e.g., an LPCK protocol) and the media controllers 333 can be configured to access a protocol corresponding to a non-LPCK mode. The ECC encoder/decoders 318 and the memory devices 326 (e.g., the memory devices 326-1-1, 326-Q-P) can be coupled to just one set of media controllers based on a current operating mode of the memory controller 300. For example, when an LPCK mode is enabled such that the memory controller 300 operates according to the LPCK mode, the media controllers 331 can be coupled to the ECC encoder/decoders 318 and the memory devices 326 (e.g., via the switches 335 and 337), while the media controller 333 are decoupled from the ECC encoder/decoders 318 and the memory devices 326. Similarly, when a non-LPCK mode is enabled such that the memory controller 300 operates according to the non-LPCK mode, the media controllers 333 can be coupled to the ECC encoder/decoders 318 and the memory devices 326 (e.g., via the switches 335 and 337), while the media controller 331 are decoupled from the ECC encoder/decoders 318 and the memory devices 326.

In an LPCK, the media controller 331 can be configured to access those memory devices 326 configured for data and parity symbols that are striped together. In the embodiment illustrated in FIG. 3, the memory devices 326-1-1, . . . , 326-1-P are configured for a set of data and parity symbols that are striped together, the memory devices 326-2-1, . . . , 326-2-P are configured for a different set of data and parity symbols that are striped together, and the memory devices 326-Q-1, 326-Q-P are configured for another different set of data and parity symbols that are striped together. In this example, the media controller 331-1 can be configured to access the memory devices 326-1-1, . . . , 326-1-P according to the LPCK protocol, the media controller 331-1 can be configured to access the memory devices 326-2-1, . . . , 326-2-P according to the LPCK protocol, and the media controller 331-1 can be configured to access the memory devices 326-Q-1, . . . , 326-Q-P according to the LPCK protocol. Data and parity symbols accessed together as a unit can be aligned at the respective media controller 331 prior to being further transferred to the central controller portion 310.

In a non-LPCK mode, the media controllers 333-1-1, . . . , 333-1-P can be configured to access the memory devices 326-1-1, . . . , 326-1-P, respectively, the media controllers 333-2-1, . . . , 333-2-P can be configured to access the memory devices 326-2-1, . . . , 326-2-P, respectively, and the media controllers 333-Q-1, . . . , 333-Q-P can be configured to access the memory devices 326-Q-1, 326-Q-P, respectively, and the media controller 333-Q-(P+1) can be configured to access the memory device 326-Q-(P+1). In the embodiment illustrated in FIG. 3, there is a 1:1:1 correlation between the ECC encoder/decoder 318, the media controllers 333, and the memory devices 326. The PHY memory interface 324-Q-(P+1) and the ECC encoder/decoder 318-(S+1) are just coupled to the media controller 333-Q-(P+1) and not to the switch 335 to be configured for just one operating mode (e.g., non-LPCK mode).

The memory devices 326 can be configured for multiple LPCK channels. As used herein, an LPCK channel refers to a group of memory devices/memory dice storing data and parity symbols that are striped together. For example, in an LPCK mode, the memory devices 326 can be configured for three separate LPCK channels (a first LPCK channel including a set of memory devices 326-1-1, . . . , 326-1-P, a second LPCK channel including a set of memory devices 326-2-1, . . . , 326-2-P, and a third LPCK channel including a set of memory devices 326-3-1, . . . , 326-3-P) with each LPCK channel including five memory devices with each LPCL channel being a 80-bit wide (e.g., each channel 325 being an 16-bit wide). In a non-LPCK mode, each memory device 326 can be configured for a channel (e.g., non-LPCK channel).

In a non-limiting example, an apparatus can include a first set of media controllers (e.g., the media controllers 331, 431 illustrated in FIG. 3 and FIG. 4, respectively) of a plurality of media controllers (e.g., the media controller 221 illustrated in FIG. 2). The first set can be couplable to a plurality of memory devices (e.g., the memory devices 126, 226, 326, 426 illustrated in FIG. 1, FIG. 2, FIG. 3, and FIG. 4, respectively) and configured to access the plurality of memory devices according to a chip kill protocol.

The apparatus can further include a second set of media controllers (e.g., the media controllers 333, 433 illustrated in FIG. 3 and FIG. 4, respectively) of the plurality of media controllers, the second set couplable to the plurality of memory devices and configured to access the plurality of memory devices according to a non-chip kill protocol. A controller (e.g., the central controller portion 110, 210, 310, 410 illustrated in FIG. 1, FIG. 2, FIG. 3, and FIG. 4, respectively) coupled to the plurality of media controllers.

The controller can be configured to enable, while the second set of media controllers is disabled, the first set of media controllers to access the plurality of memory devices according to the chip kill protocol. The controller can be further configured to enable, while the first set of media controllers is disabled, the second set of media controllers to access the plurality of memory devices according to the non-chip kill protocol.

Each media controller of the first set can be coupled to a respective set of memory devices of the plurality. Each media controller of the first set can be configured to access, from the respective set of memory devices, subsets of data that are striped together for a chip kill operation. In this example, each media controller of the first set can be configured to wait, to align the subsets of data and prior to further providing the subsets of data to the controller, until each one of the subsets of data is received from each one of the respective set of memory devices.

The first set and the second set of media controllers can be couplable to the plurality of memory devices via one or more multiplexers or one or more demultiplexers, or both (e.g., the multiplexers/demultiplexers 335 illustrated in FIG. 3). In this example, the controller can be configured to couple the first set of media controllers, instead of the second set of media controllers, to the plurality of memory devices using the one or more multiplexers or one or more demultiplexers, or both, to access the plurality of memory devices according to the chip kill protocol. Further, the controller can be configured to couple the second set of media controllers, instead of the first set of media controllers, to the plurality of memory devices using the one or more multiplexers or one or more demultiplexers, or both, to access the plurality of memory devices according to the non-chip kill protocol. In some embodiments, the plurality of memory devices can include one or more additional memory devices (e.g., the memory device 326-Q-(P+1) illustrated in FIG. 3 or the memory device 426-16 illustrated in FIG. 4) that are not coupled to the first set of media controllers.

In another non-limiting example, an apparatus can include a plurality of memory devices (e.g., the memory devices 126, 226, 326, 426 illustrated in FIG. 1, FIG. 2, FIG. 3, and FIG. 4, respectively) and a memory controller (e.g., the memory controller 100, 200, 300, 400 illustrated in FIG. 1, FIG. 2, FIG. 3, and FIG. 4, respectively). A first portion (e.g., the back end portion 119, 219, 319, 419 illustrated in FIG. 1, FIG. 2, FIG. 3, and FIG. 4, respectively) of the memory controller can include a plurality of physical memory interfaces (e.g., the PHY memory interfaces 224, 324, 434 illustrated in FIG. 2, FIG. 3, and FIG. 4, respectively) and a plurality of media controllers (e.g., the media controller 221 illustrated in FIG. 2). The plurality of media controllers can include a first set of media controllers (e.g., the media controllers 331, 431 illustrated in FIG. 3 and FIG. 4, respectively) couplable to at least a portion of the plurality of memory devices via a portion of the plurality of physical memory interfaces and a second set of media controllers (e.g., the media controllers 333, 433 illustrated in FIG. 3 and FIG. 4, respectively) couplable to the plurality of memory devices via the plurality of physical memory interfaces. The first portion of the memory controller can further include one or more switches (e.g., the switches 335 and 337 illustrated in FIG. 3) coupled between the plurality of media controllers and the plurality of physical memory interfaces.

A second portion (e.g., the central controller portion 110, 210, 310, 410 illustrated in FIG. 1, FIG. 2, FIG. 3, and FIG. 4, respectively) of the memory controller coupled to the first portion of the memory controller. The second portion of the memory controller can be configured to control the one or more switches to couple the first set of media controllers to the portion of the plurality of physical memory interfaces to allow the first set of media controllers to access the at least the portion of the plurality of memory devices according to a chip kill protocol. The second portion of the memory controller can be further configured to couple the second set of media controllers to the plurality of physical memory interfaces to allow the second set of media controllers to access the plurality of memory devices according to a non-chip kill protocol.

Stated alternatively, the second portion of the memory controller can be configured to control the one or more switches to decouple the second set of media controllers from the plurality of physical memory interfaces to allow the first set of media controllers to access the at least the portion of the plurality of memory devices according to the chip kill protocol. The second portion of the memory controller can be further configured to control the one or more switches to decouple the first set of media controllers from the portion of the plurality of physical memory interfaces to allow the first set of media controllers to access the at least the portion of the plurality of memory devices according to the non-chip kill protocol.

The one or more switches can be a first set of switches (e.g., the switches 335 illustrated in FIG. 3) and the first portion of the memory controller further comprises a second set of switches (e.g., the switches 337 illustrated in FIG. 3) coupled between the plurality of media controllers and the second portion of the memory controller. In this example, the second portion of the memory controller can be configured to control the second set of switches to couple the first set of media controllers to the second portion of the memory controller to allow the first set of media controllers to access the at least the portion of the plurality of memory devices according to the chip kill protocol. Further in this example, the second portion of the memory controller can be configured to control the second set of switches to couple the second set of media controllers to the second portion of the memory controller to allow the second set of media controllers to access the at least the portion of the plurality of memory devices according to the non-chip kill protocol. In some embodiments, the one or more switches comprise a double data rate (DDR) physical interface (DFI) multiplexer or demultiplexer.

In some embodiments, a respective media controller (e.g., the media controllers 331, 431 illustrated in FIG. 3 and FIG. 4, respectively) of the first set of media controllers can be configured to receive subsets of data from respective memory devices of the at least the portion of the plurality of memory devices and parity data from a respective memory device of the at least the portion of the plurality of memory devices. In this example, the second portion of the memory controller (e.g., the central controller portion 110, 210, 310, 410 illustrated in FIG. 1, FIG. 2, FIG. 3, and FIG. 4, respectively) can be configured to receive the subsets of data and the parity data from the respective media controller and perform a chip kill operation on the subsets of data using the parity data. Further in this example, the respective media controller of the first set can be configured to prevent a subset of the subsets of data from being provided to the second portion of the memory controller unless each subset of the subsets of data is received at the respective media controller of the first set.

Figure 4:
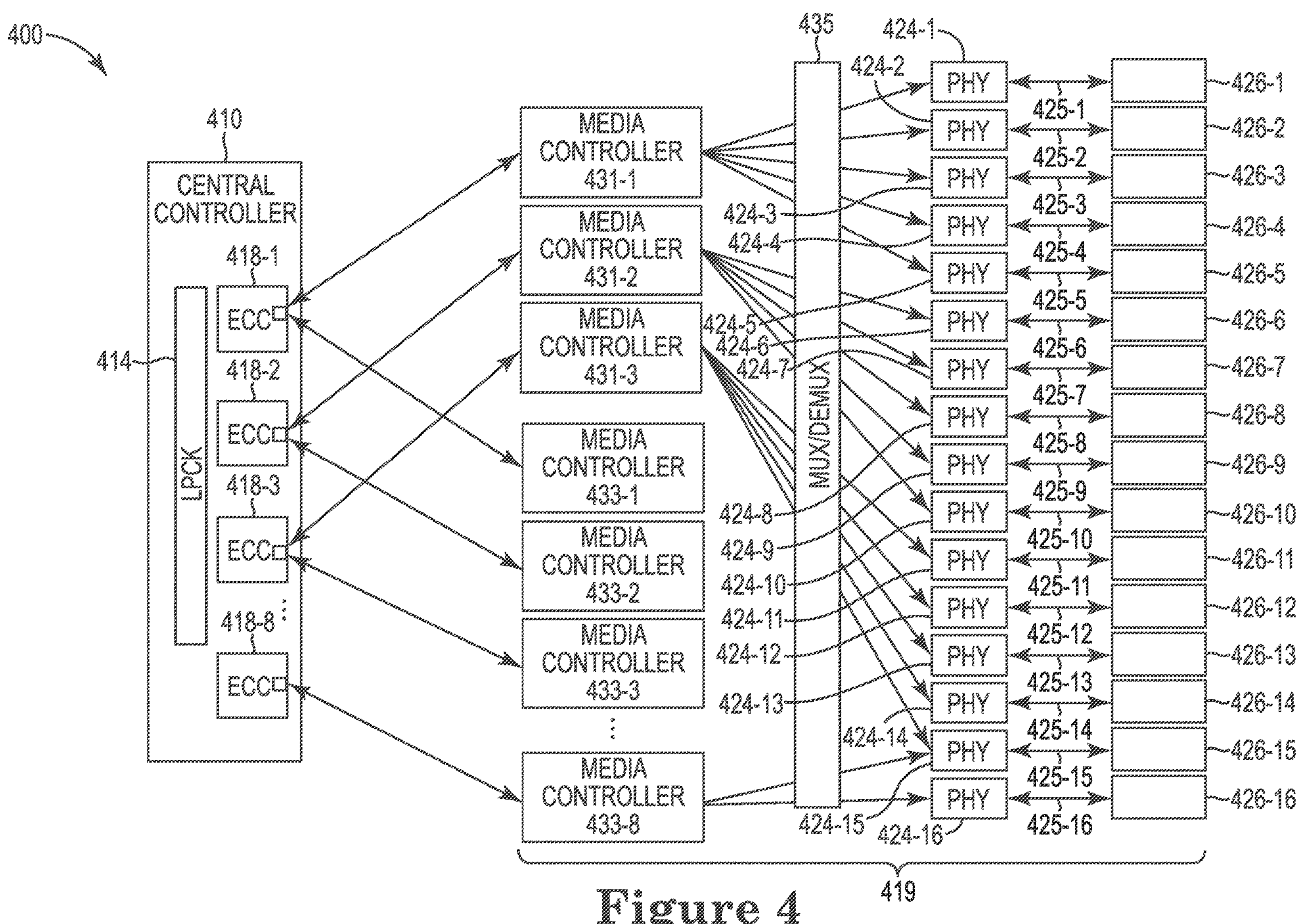
FIG. 4 is a functional block diagram illustrating a portion of a memory controller including a central controller portion and a back end portion in accordance with a number of embodiments of the present disclosure.

FIG. 4 is a functional block diagram illustrating a portion of a memory controller 400 including a central controller portion 410 (e.g., alternatively referred to as "central controller) and a back end portion 419 in accordance with a number of embodiments of the present disclosure. The central controller portion 410 can include an LPCK circuitry 414 and ECC encoders/decoders 418-1, . . . , 418-8. The back end portion 419 can include PHY memory interfaces 424-1, . . . , 424-16 and memory devices 426-1, . . . , 426-16 that are coupled to the respective PHY memory interfaces 424 via the respective channels 425-1, . . . , 425-16 (referred to collectively as channels 425). As described herein, the memory devices 426-1, . . . , 426-16 (referred to collectively as memory devices 426) can include a quantity of memory dice with at least some (e.g., two) memory dice coupled to the respective channel 425 for exchanging data stored in the memory device 426.

The media controllers 431-1, 431-2, and 431-3 can be analogous to the media controllers 331 illustrated in FIG. 3 that are configured to access the memory devices 426 when an LPCK mode is enabled and according to the LPCK protocol. Further, the media controllers 433-1, . . . , 433-8 can be analogous to the media controllers 333 illustrated in FIG. 3 that are configured to access the memory devices 426 when a non-LPCK mode is enabled and according to the non-LPCK protocol.

When an LPCK mode is enabled, the media controllers 331 can be coupled to the respective ECC encoder/decoder 318 and the PHY media interfaces 424. In contrast, when a non-LPCK mode is enabled (such that an LPCK mode is disabled), the media controllers 331 can be coupled to the ECC encoder/decoder 318 and the PHY media interfaces 424. The media controllers 431 and 433 can be coupled to the respective PHY memory interfaces 424 via one or more multiplexers/demultiplexers 435 ("Mux/DeMux" shown in FIG. 4), which can include a number of switches 335 illustrated in FIG. 3.

In the embodiment illustrated in FIG. 4, the media controllers 431 can be respectively coupled to a set of PHY memory interfaces 424 that are further coupled to the respective memory devices 426 respectively configured for data and parity symbols that are striped together. For example, when the LPCK mode is enabled, the media controller 431-1 can be coupled to the PHY memory interfaces 424-1, . . . , 424-5 (that are further coupled to the memory devices 426-1, . . . , 426-5, respectively), the media controller 431-2 can be coupled to the PHY memory interfaces 424-6, . . . , 424-10 (that are further coupled to the memory devices 426-6, . . . , 426-10, respectively), and the media controller 431-3 can be coupled to the PHY memory interfaces 424-11, . . . , 424-15 (that are further coupled to the memory devices 426-11, . . . , 426-15, respectively).

Data accessed by each media controller 431 can be aligned at the respective media controller 431 prior to being transferred to the central controller portion 410. For example, data accessed from the memory devices 431-1 to 431-5 can be aligned at the media controller 431-1 prior to being transferred to the central controller portion 410, data accessed from the memory devices 431-6 to 431-10 can be aligned at the media controller 431-2 prior to being transferred to the central controller portion 410, and data accessed from the memory devices 431-11 to 431-15 can be aligned at the media controller 431-3 prior to being transferred to the central controller portion 410.

Further, in the embodiment illustrated in FIG. 4, the media controllers 433 can be respectively coupled to a different set of PHY memory interfaces 424. For example, when the non-LPCK mode is enabled, the media controllers 433-1 can be coupled to the PHY memory interfaces 424-1, 424-2, the media controllers 433-2 can be coupled to the PHY memory interfaces 424-3, 424-4, the media controllers 433-3 can be coupled to the PHY memory interfaces 424-5, 424-6, the media controllers 433-4 can be coupled to the PHY memory interfaces 424-7, 424-8, the media controllers 433-5 can be coupled to the PHY memory interfaces 424-9, 424-10, the media controllers 433-6 can be coupled to the PHY memory interfaces 424-11, 424-12, the media controllers 433-7 can be coupled to the PHY memory interfaces 424-13, 424-14, and the media controllers 433-8 can be coupled to the PHY memory interfaces 424-15, 424-16. The data accessed by each media controller 433 may not be aligned at the respective media controller 433, but transferred to the central controller portion 410, for example, in an order in which they are received.

In the embodiment illustrated in FIG. 4, in an LPCK mode, the memory devices 426-1, . . . , 426-5 can be configured for a first LPCK channel, the memory devices 426-1, . . . , 426-5 can be configured for a second LPCK channel, and the memory devices 426-1, . . . , 426-5 can be configured for a third LPCK channel. In a non-LPCK mode, each memory device 426 can be configured for a channel (e.g., non-LPCK channel) such that the memory devices 426 are configured for sixteen non-LPCK channels.

Figure 5:
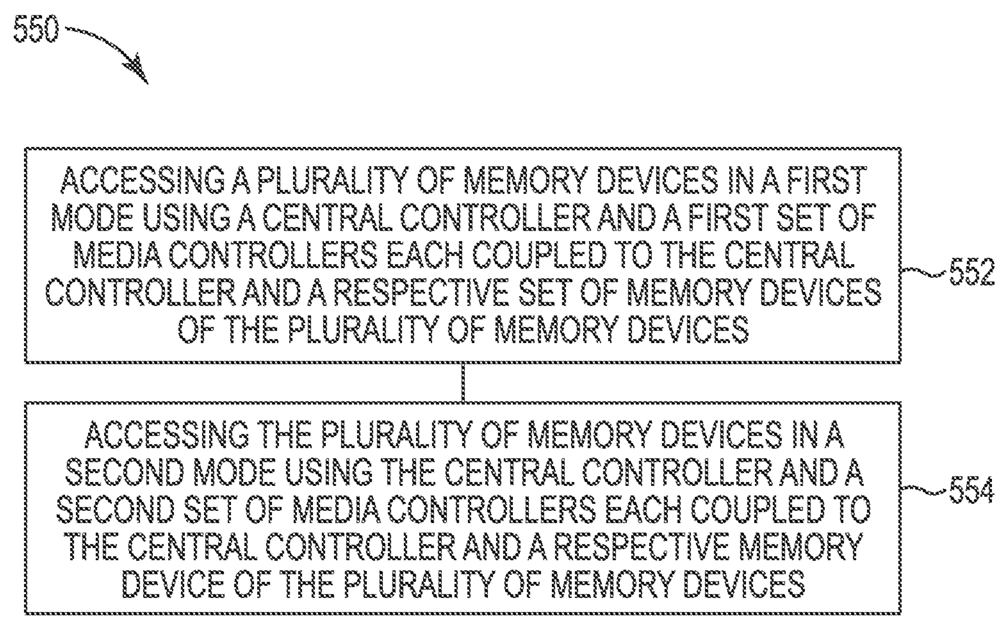
FIG. 5 is a flow diagram of a method for accessing memory devices in different operating modes in accordance with a number of embodiments of the present disclosure.

FIG. 5 is a flow diagram of a method 550 for accessing memory devices in different operating modes in accordance with a number of embodiments of the present disclosure. The method 550 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 550 is performed by the memory controller 100, 200, 300, 400 illustrated in FIG. 1, FIG. 2, FIG. 3, and FIG. 4, respectively. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 552, a plurality of memory devices (e.g., the memory devices 126, 226, 326, 426 illustrated in FIG. 1, FIG. 2, FIG. 3, and FIG. 4, respectively) can be accessed in a first mode (e.g., an LPCK mode) using a central controller (e.g., the central controller portion 110, 210, 310, 410 illustrated in FIG. 1, FIG. 2, FIG. 3, and FIG. 4, respectively) and a first set of media controllers (e.g., the media controllers 331, 431 illustrated in FIG. 3 and FIG. 4, respectively) each coupled to the central controller and a respective set of memory devices of the plurality of memory devices. For example, to access the plurality of memory devices in the first mode, the first set of media controllers can be enabled by coupling the first set of media controllers to the plurality of memory devices instead of the second set of media controllers.

At 554, the plurality of memory devices can be accessed in a second mode (e.g., a non-LPCK mode) using the central controller and a second set of media controllers (e.g., the media controllers 333, 433 illustrated in FIG. 3 and FIG. 4, respectively) each coupled to the central controller and a respective memory device of the plurality of memory devices. For example, to access the plurality of memory devices in the second mode, the first set of media controllers can be enabled by coupling the second set of media controllers to the plurality of memory devices instead of the first set of media controllers.

When the plurality of memory devices are accessed in the LPCK mode (alternatively referred to as a chip kill mode), subsets of data that are striped together can be received from multiple memory devices of the plurality. Subsequently, the subsets of data can be aligned at the respective media controller of the first set prior to providing the subsets of data to a controller.

When the plurality of memory devices are accessed in the non-LPCK mode (alternatively referred to as a non-chip kill mode), subsets of data can be received from one or more memory devices of the plurality of memory devices by each media controller of the second set. Subsequently, the subsets of data can be provided to a controller in an order in which they were received at the respective media controller of the second set.

FIG. 6 is a flow diagram of a method 660 for accessing memory devices in different operating modes in accordance with a number of embodiments of the present disclosure. The method 660 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 660 is performed by the memory controller 100, 200, 300, 400 illustrated in FIG. 1, FIG. 2, FIG. 3, and FIG. 4, respectively. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 662, a first set of media controllers (e.g., the media controllers 331, 431 illustrated in FIG. 3 and FIG. 4, respectively) can be enabled to access a plurality of memory devices (e.g., the memory devices 126, 226, 326, 426 illustrated in FIG. 1, FIG. 2, FIG. 3, and FIG. 4, respectively) using a central controller (e.g., the central controller portion 110, 210, 310, 410 illustrated in FIG. 1, FIG. 2, FIG. 3, and FIG. 4, respectively) and according to a chip kill protocol. The first set of media controllers can be enabled by coupling the first set of media controllers to the plurality of memory devices and decoupling a second set of media controllers from the plurality of memory devices.

At 664, a second set of media controllers (e.g., the media controllers 333, 433 illustrated in FIG. 3 and FIG. 4, respectively) can be enabled to access the plurality of memory devices using the central controller and according to a non-chip kill protocol. The second set of media controllers can be enabled by coupling the second set of media controllers to the plurality of memory devices and decoupling the first set of media controllers from the plurality of memory devices.

In some embodiments, each memory device of the plurality can be coupled to a respective switch that is further coupled to a respective media controller of the first set and a respective media controller of the second set. In this example, the method 660 can further include (to access the plurality of memory devices according to the chip kill protocol coupling) coupling, using the respective switch, the respective media controller of the first set coupled to a memory device of the plurality of memory devices and decoupling, using the respective switch, the respective media controller of the second set from the memory device of the plurality of memory devices.

In some embodiments, each media controller of the first set, when enabled, can be coupled to a respective set of memory devices of the plurality storing subsets of data that are striped together. In this example, the method 660 can include accessing the subsets of data from the respective set of memory devices.

In some embodiments, each media controller of the first set, when enabled, can be further coupled to a controller. In this example, the method 660 can further include preventing at least one subset of the subsets of data or parity data from being provided to the controller unless the subsets of the data are received and aligned at the respective media controller.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:

accessing a plurality of memory devices in a first mode using a central controller and a first set of media controllers each coupled to the central controller and a respective set of memory devices of the plurality of memory devices; and accessing the plurality of memory devices in a second mode using the central controller and a second set of media controllers each coupled to the central controller and a respective memory device of the plurality of memory devices.

2. The method of claim 1, further comprising, to access the plurality of memory devices in the first mode, enabling the first set of media controllers by coupling the first set of media controllers to the plurality of memory devices instead of coupling the second set of media controllers to the plurality of memory devices.

3. The method of claim 1, further comprising, to access the plurality of memory devices in the second mode, enabling the first set of media controllers by coupling the second set of media controllers to the plurality of memory devices instead of coupling the first set of media controllers to the plurality of memory devices.

4. The method of claim 1, wherein:

the first mode is a chip kill mode; and accessing the plurality of memory devices in the first mode using the first set of media controllers comprises:

receiving subsets of data that are striped together from multiple memory devices of the plurality; and aligning, prior to providing the subsets of data to a controller, the subsets of data at the respective media controller of the first set.

5. The method of claim 1, wherein:

the second mode is a non-chip kill mode; and accessing the plurality of memory device in the second mode using the second set of media controllers each coupled to the respective memory device of the plurality of memory devices further comprises:

receiving subsets of data from one or more memory devices of the plurality of memory devices by each media controller of the second set; and providing the subsets of data to a controller in an order in which they were received at the respective media controller of the second set.

6. An apparatus, comprising:

a first set of media controllers of a plurality of media controllers, the first set couplable to a plurality of memory devices and configured to access the plurality of memory devices according to a chip kill protocol;

a second set of media controllers of the plurality of media controllers, the second set couplable to the plurality of memory devices and configured to access the plurality of memory devices according to a non-chip kill protocol; and a controller coupled to the plurality of media controllers, the controller configured to enable, while the second set of media controllers is disabled, the first set of media controllers to access the plurality of memory devices according to the chip kill protocol.

7. The apparatus of claim 6, wherein the controller is configured to enable, while the first set of media controllers is disabled, the second set of media controllers to access the plurality of memory devices according to the non-chip kill protocol.

8. The apparatus of claim 6, wherein, when each media controller of the first set is coupled to a respective set of memory devices of the plurality, each media controller of the first set is configured to access, from the respective set of memory devices, subsets of data that are striped together for a chip kill operation.

9. The apparatus of claim 8, wherein each media controller of the first set is configured to wait, to align the subsets of data and prior to further providing the subsets of data to the controller, until each one of the subsets of data is received from each one of the respective set of memory devices.

10. The apparatus of claim 6, wherein the first set and the second set of media controllers are couplable to the plurality of memory devices via one or more multiplexers or one or more demultiplexers, or both.

11. The apparatus of claim 10, wherein the controller is configured to couple the first set of media controllers, instead of the second set of media controllers, to the plurality of memory devices using the one or more multiplexers or one or more demultiplexers, or both, to access the plurality of memory devices according to the chip kill protocol.

12. The apparatus of claim 10, wherein the controller is configured to couple the second set of media controllers, instead of the first set of media controllers, to the plurality of memory devices using the one or more multiplexers or one or more demultiplexers, or both, to access the plurality of memory devices according to the non-chip kill protocol.

13. The apparatus of claim 6, wherein the plurality of memory devices further comprises one or more additional memory devices that are not coupled to the first set of media controllers.

14. The apparatus of claim 6, wherein the apparatus comprises a memory controller coupled to a host, and wherein the memory controller comprises the controller and the first and second sets of media controllers.

15. A method, comprising:

enabling, to access a plurality of memory devices using a central controller and according to a chip kill protocol, a first set of media controllers by:

coupling the first set of media controllers to the plurality of memory devices; and decoupling a second set of media controllers from the plurality of memory devices;

enabling, to access the plurality of memory devices using the central controller and according to a non-chip kill protocol, a second set of media controllers by:

coupling the second set of media controllers to the plurality of memory devices; and decoupling the first set of media controllers from the plurality of memory devices.

16. The method of claim 15, wherein each memory device of the plurality is coupled to a respective switch that is further coupled to a respective media controller of the first set and a respective media controller of the second set, and wherein the method further comprises, to access the plurality of memory devices according to the chip kill protocol:

coupling, using the respective switch, the respective media controller of the first set coupled to a memory device of the plurality of memory devices; and decoupling, using the respective switch, the respective media controller of the second set from the memory device of the plurality of memory devices.

17. The method of claim 15, wherein each media controller of the first set, when enabled, is coupled to a respective set of memory devices of the plurality storing subsets of data that are striped together and the method further comprises accessing the subsets of data from the respective set of memory devices.

18. The method of claim 17, wherein each media controller of the first set, when enabled, is further coupled to a controller, and the method further comprises preventing at least one subset of the subsets of data or parity data from being provided to the controller unless the subsets of the data are received and aligned at the respective media controller.

19. An apparatus, comprising:

a plurality of memory devices;

a first portion of a memory controller comprising:

a plurality of physical memory interfaces;

a plurality of media controllers, comprising:

a first set of media controllers couplable to at least a portion of the plurality of memory devices via a portion of the plurality of physical memory interfaces; and a second set of media controllers couplable to the plurality of memory devices via the plurality of physical memory interfaces; and switch circuitry coupled between the plurality of media controllers and the plurality of physical memory interfaces; and a second portion of the memory controller coupled to the first portion of the memory controller, the second portion of the memory controller configured to control the switch circuitry to:

couple the first set of media controllers to the portion of the plurality of physical memory interfaces to allow the first set of media controllers to access the at least the portion of the plurality of memory devices according to a chip kill protocol; and couple the second set of media controllers to the plurality of physical memory interfaces to allow the second set of media controllers to access the plurality of memory devices according to a non-chip kill protocol.

20. The apparatus of claim 19, wherein the second portion of the memory controller is configured to control the switch circuitry to:

decouple the second set of media controllers from the plurality of physical memory interfaces to allow the first set of media controllers to access the at least the portion of the plurality of memory devices according to the chip kill protocol; and decouple the first set of media controllers from the portion of the plurality of physical memory interfaces to allow the first set of media controllers to access the at least the portion of the plurality of memory devices according to the non-chip kill protocol.

21. The apparatus of claim 19, wherein the switch circuitry is a first set of switches and the first portion of the memory controller further comprises a second set of switches coupled between the plurality of media controllers and the second portion of the memory controller.

22. The apparatus of claim 21, wherein the second portion of the memory controller is configured to control the second set of switches to:

couple the first set of media controllers to the second portion of the memory controller to allow the first set of media controllers to access the at least the portion of the plurality of memory devices according to the chip kill protocol; and couple the second set of media controllers to the second portion of the memory controller to allow the second set of media controllers to access the at least the portion of the plurality of memory devices according to the non-chip kill protocol.

23. The apparatus of claim 19, wherein a respective media controller of the first set of media controllers is configured to receive:

subsets of data from respective memory devices of the at least the portion of the plurality of memory devices; and parity data from a respective memory device of the at least the portion of the plurality of memory devices.

24. The apparatus of claim 23, wherein the second portion of the memory controller is configured to:

receive the subsets of data and the parity data from the respective media controller; and perform a chip kill operation on the subsets of data using the parity data.

25. The apparatus of claim 23, wherein the respective media controller of the first set is configured to prevent a subset of the subsets of data from being provided to the second portion of the memory controller unless each subset of the subsets of data is received at the respective media controller of the first set.

26. The apparatus of claim 19, wherein the switch circuitry comprise a double data rate (DDR) physical interface (DFI) multiplexer or demultiplexer.

* * * * *